[12] United States Patent
Guillet et al.

(10) Patent No.: US 8,256,708 B2
(45) Date of Patent: Sep. 4, 2012

(54) DEVICE FOR ATTACHING AN AIRCRAFT ENGINE COMPRISING A THRUST FORCE TAKE-UP DEVICE WITH A COMPACT DESIGN

(75) Inventors: Emmanuel Guillet, Plaisance du Touch (FR); Jean-Marc Martinou, L'Union (FR); Pascal Gardes, Lherm (FR)

(73) Assignee: Airbus Operations SAS, Toulouse (FR)

( * ) Notice: Subject to any disclaimer, the term of this patent is extended or adjusted under 35 U.S.C. 154(b) by 324 days.

(21) Appl. No.: 12/674,555

(22) PCT Filed: Aug. 22, 2008

(86) PCT No.: PCT/EP2008/061010
§ 371 (c)(1),
(2), (4) Date: Apr. 20, 2010

(87) PCT Pub. No.: WO2009/027333
PCT Pub. Date: Mar. 5, 2009

(65) Prior Publication Data
US 2011/0114786 A1    May 19, 2011

(30) Foreign Application Priority Data
Aug. 24, 2007   (FR) ...................................... 07 57166

(51) Int. Cl.
*B64D 27/00* (2006.01)
(52) U.S. Cl. .......................................... 244/54; 248/554
(58) Field of Classification Search .................... 244/54; 248/554, 555, 556, 557
See application file for complete search history.

(56) References Cited

U.S. PATENT DOCUMENTS

| 7,950,604 | B2* | 5/2011 | Combes et al. | 244/54 |
|---|---|---|---|---|
| 2001/0025902 | A1* | 10/2001 | Jule et al. | 244/54 |
| 2003/0025033 | A1* | 2/2003 | Levert et al. | 244/54 |
| 2004/0135029 | A1* | 7/2004 | Bansemir et al. | 244/54 |
| 2004/0251380 | A1* | 12/2004 | Pasquer et al. | 244/54 |
| 2005/0067528 | A1* | 3/2005 | Loewenstein et al. | 244/54 |
| 2007/0069068 | A1* | 3/2007 | Lafont et al. | 244/54 |
| 2007/0069069 | A1* | 3/2007 | Diochon et al. | 244/54 |
| 2010/0116926 | A1 | 5/2010 | Combes et al. | |

FOREIGN PATENT DOCUMENTS

| EP | 0 564 126 A1 | 10/1993 |
|---|---|---|
| EP | 0 879 759 A2 | 11/1998 |
| EP | 0 879 759 A3 | 11/1998 |
| EP | 1 031 507 A2 | 8/2000 |
| EP | 1 031 507 A3 | 8/2000 |
| FR | 2 887 850 | 1/2007 |

* cited by examiner

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

An aircraft engine attachment device including a rigid structure and a mechanism attaching the engine on the rigid structure, the attachment mechanism including a rear engine attachment and a device for taking-up thrust forces generated by the engine. The rear engine attachment is attached to the rigid structure by two lateral fittings attached to the rigid structure. The force take-up device includes two connecting rods mechanically connected to a spreader beam by a mechanical connection, a connection fitting attached to the rear engine attachment and mechanically connected to the rigid structure by a thrust pin, the lateral fittings including a stop mechanism to limit pivoting of the spreader beam if a connecting rod breaks and ensuring transmission of thrust forces to the rigid structure.

11 Claims, 9 Drawing Sheets

DEVICE FOR ATTACHING AN AIRCRAFT ENGINE COMPRISING A THRUST FORCE TAKE-UP DEVICE WITH A COMPACT DESIGN

TECHNICAL FIELD AND PRIOR ART

This invention relates in general to a device for attaching an aircraft engine, for example intended to be inserted between an aircraft wing and the engine concerned, an engine assembly including such an attachment device, as well as an aircraft comprising at least one such attachment device.

The invention can be used on any type of aircraft equipped with turbojets or turboprop engines.

This type of attachment device, also called an attachment strut or "EMS" (for Engine Mounting Structure), can be used indifferently to suspend an engine below the wing of the aircraft, mount said engine above said same wing, or to attach said engine in the rear portion of the aircraft fuselage.

Such an attachment device is indeed intended to form the connection interface between a turboshaft engine and a wing of the aircraft. It enables the forces generated by the associated turboshaft engine to be transmitted to the structure of said aircraft, and also allows the flow of fuel, electrical and hydraulic systems and air between the engine and the aircraft.

To ensure transmission of the forces, the attachment device comprises a rigid structure, called the primary structure, often of the "box" type, i.e. formed by the assembly of upper and lower spars and side panels connected to one another by means of cross ribs.

In addition, the device is equipped with attachment means inserted between the turboshaft engine and the rigid structure, which means generally comprise two engine attachments, as well as a device for taking up thrust forces generated by the turboshaft engine.

In the prior art, this take-up device includes, for example, two lateral connecting rods connected to the case of the turboshaft engine, and connected to a spreader beam, itself pivotably connected to the rigid structure of the attachment device.

Similarly, the attachment device also comprises another series of attachments forming a mounting system inserted between the rigid structure and the wing of the aircraft, in which this system normally consists of two or three attachments.

Finally, the strut is equipped with a secondary structure ensuring segregation and maintenance of the systems while supporting aerodynamic fairings.

As mentioned above, in the solutions previously proposed, the thrust force take-up device integrates a spreader beam pivotably connected to the rigid structure, by means of a connecting pin. It is thus indicated that, to ensure a so-called "failsafe" function for the transmission of forces in the longitudinal direction, the spreader beam is normally produced with two superimposed fittings, just as the connecting pin takes the form of a double pin. Thus, if one of the two superimposed fittings forming the spreader beam breaks, the other fitting alone will take up the forces coming from the lateral connecting rods, and, if the external pin of the double connecting pin breaks, the internal pin will take over in order to take up and transmit these same forces in the longitudinal direction.

Attachment devices are known from the prior art in which the rear engine attachment and the thrust force take-up device are distinct and longitudinally offset. The attachment of the engine to the lower spar of the box is performed by means of a pin secured to the engine and passing through the spar. This pin is generally tilted with respect to the vertical direction. This tilting makes the assembly complex and requires special equipment to be used to enable such an attachment.

In addition, certain aircraft engines have relatively large external diameters with respect to classic engine diameters, which requires bringing the engine as close as possible to the wing so as to reduce the ground clearance impact. Bringing them together then limits the possibility of using special equipment.

Moreover, document FR 2 887 850 describes a device for taking up forces in which the failsafe function is achieved, in particular by means of stops provided at the front of the force take-up device, in which the stops are attached directly on the box. However, in certain applications, the box has a relatively low width, not enabling such stops to be attached.

It is therefore an objective of this invention to provide an attachment device providing only two interface points between the engine and the box so that the engine can be mounted as close as possible to the wing without requiring special equipment.

DESCRIPTION OF THE INVENTION

The aforementioned objective is achieved by an engine attachment device for an aircraft comprising a rear engine attachment attached to a box by two lateral fittings taking up the vertical forces and a force take-up device comprising two connecting rods connected to a spreader beam mechanically connected to the box by a connection fitting, in which the failsafe function in the event of a breakage of a connecting rod is ensured by one of the two lateral fittings. In normal operation, the thrust forces and the lateral forces are taken up by the box by a thrust pin mounted in the connection fitting.

Thus, the engine is attached to the box and forces are taken up at two attachment points, thereby avoiding the need to use special equipment for the assembly. Moreover, the spreader beam stop attached to the strut is eliminated.

In other words, the attachment device is simplified by using lateral fittings as a spreader beam stop, thereby enabling the stops attached to the box to be eliminated.

Advantageously, the failsafe function of the mechanical connection between the spreader beam and the rear attachment is ensured by doubling the connection fitting.

The two connection fittings are fitted, thereby enabling the bulk of the device to be reduced.

The attachment device provides the advantage of enabling easier disassembly of the engine, since there are only two interface points between the engine and the box.

This invention thus relates primarily to an aircraft engine attachment device, comprising a rigid structure and means for attaching said engine to said rigid structure, in which said attachment means comprise a rear engine attachment and a device for taking up thrust forces generated by the engine, in which the rear engine attachment is attached to the rigid structure by means of two lateral fittings attached to the rigid structure, in which said force take-up device comprises two connecting rods mechanically connected to a spreader beam at the level of a rear end by a mechanical connection, a connection fitting attached to the rear engine attachment and mechanically connected to the rigid structure by a thrust pin, in which the lateral fittings comprise stop means intended to limit the pivoting of the spreader beam if a connecting rod breaks and ensuring the transmission of thrust forces generated by the engine to the rigid structure.

Advantageously, the connection fitting is failsafe; for example, it comprises an internal fitting and an external fitting.

In a first embodiment, the external fitting comprises a hollow body and a plate extending toward the front of said casing and the internal fitting comprises a body housed in the hollow body of the external fitting and comprising a plate extending toward the front from the body, said plate being parallel to the first plate, in which the two plates form a clevis mounting to which the spreader beam is mechanically connected.

The spreader beam can then comprise a first and a third portion forming a clevis mounting and surrounding the clevis mounting of the connection fitting and a second portion inserted between the first and the third portions, in which said second portion penetrates the clevis mounting of the connection fitting.

In a second embodiment, the external fitting comprises a body formed by a casing without a base, and a clevis mounting extends toward the front from a front wall of the casing; said front wall comprises a hole enabling communication between the inside of the casing and the space between the branches of the clevis mounting, and the internal fitting comprises a body housed in the body of the external fitting and a plate passing through the hole of the front wall and housed between the branches of the clevis mounting; the spreader beam comprises two portions forming a clevis mounting; said clevis mounting receives the plate of the internal fitting and is received in the clevis mounting of the external fitting.

For example, the bodies of the external and internal fittings each comprise means for peripheral attachment to the rear engine attachment by tension bolts, in which the means for attaching the internal fitting are clamped between the means for attaching the external fitting and the rear engine attachment; this enables the same tension bolts to be used to attach the two fittings to the rear engine attachment.

These attachment means can be of the flange or pin type.

Preferably, each lateral fitting comprises a first plate attached by fishplating to the rigid structure and a second plate orthogonal to the first plate and substantially parallel to a lower spar of the rigid structure, in which the rear engine attachment comprises a base attached by tension bolts to the rigid structure.

Said second plate can also comprise at least two holes, in which the base is equipped with projecting pins, said pins comprise bores orthogonal to their axis, the pins pass through the second plate by way of said holes and an internal pin is mounted in each bore of the pins. These pins take up the lateral forces and can, in the event of a breakage of one of the lateral fittings, take up the torque according to the longitudinal axis.

Advantageously, the fittings comprise stop surfaces against which the spreader beam is intended to come into contact in the event of a breakage of one of the connecting rods.

Advantageously, the thrust pin is doubled and comprises an internal pin and an external pin. Similarly, the mechanical connection pins between the spreader beam and the connection fitting can also be doubled.

This invention also relates to an engine assembly including an engine and an engine attachment device, in which said attachment device is a device according to this invention.

This invention also relates to an aircraft comprising at least one engine assembly according to the present invention, assembled on a wing or on a rear portion of the fuselage of said aircraft.

BRIEF DESCRIPTION OF THE DRAWINGS

This invention can be better understood with the following description and the appended drawings, in which.

DETAILED DESCRIPTION OF SPECIFIC EMBODIMENTS

In the following description, the term "longitudinal" should be considered with respect to the X-axis.

Figure 1:
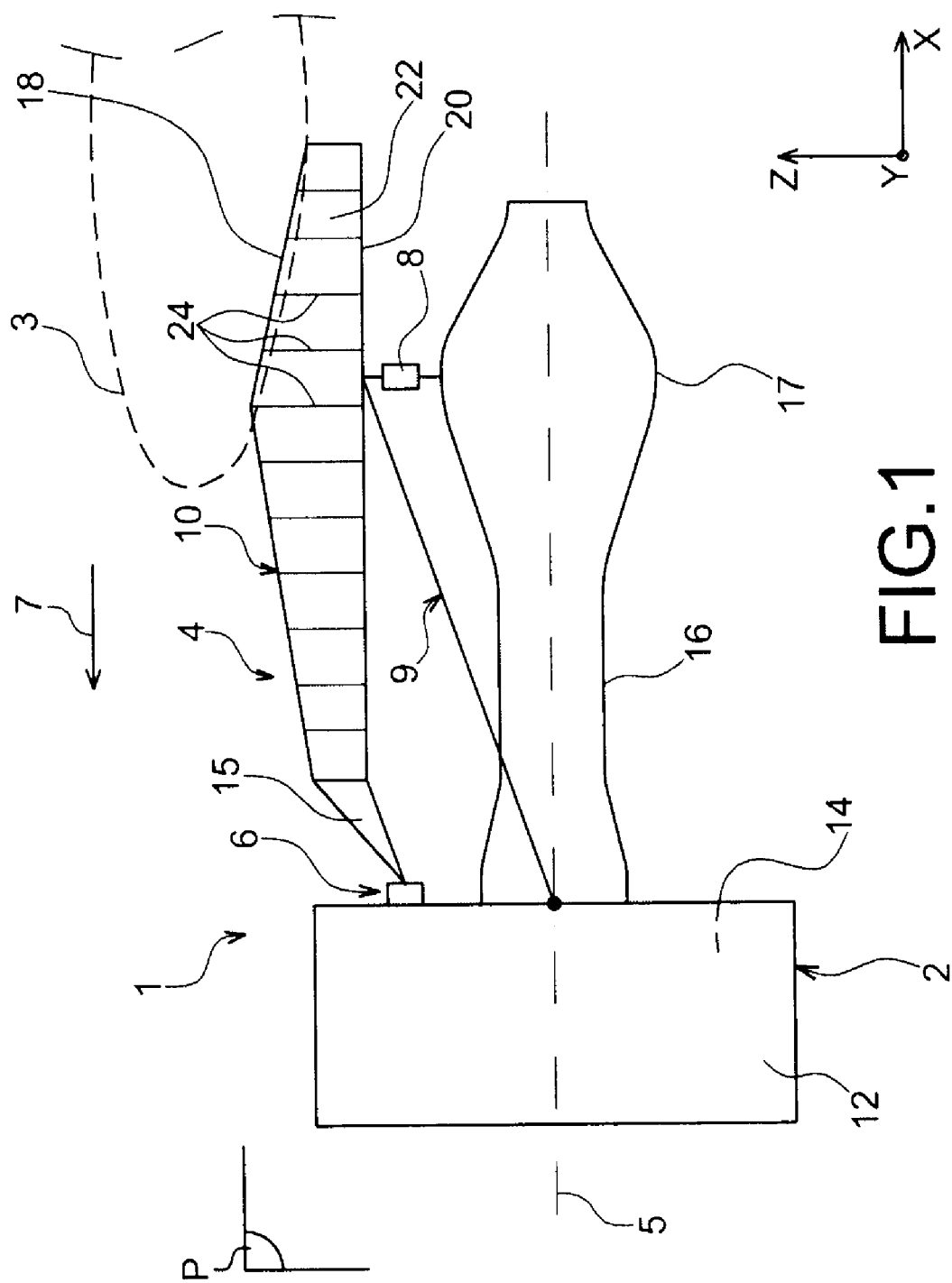
FIG. 1 shows a partially diagrammatic side view of an aircraft engine assembly, including an attachment strut to which the present invention is applied.

FIG. 1 shows an engine assembly 1 for an aircraft intended to be attached below a wing 3 of said aircraft (not shown), in which said assembly 1 comprises an attachment strut 4 according to a preferred embodiment of the present invention.

Overall, the engine assembly 1 is comprised of an engine such as a turbojet 2 and the attachment strut 4, in which the latter is equipped in particular with a plurality of engine attachments 6, 8 and 9 and a rigid structure 10 having these same attachment. By way of indication, it is noted that the assembly 1 is intended to be surrounded by a nacelle (not shown), and that the attachment strut 4 comprises another series of attachments (not shown) enabling the suspension of said assembly 1 to be ensured below the wing of the aircraft.

Throughout the following description, by convention, the longitudinal direction of the strut 4, which is the same as the longitudinal direction of the turbojet 2, will be called X, this direction X being parallel to a longitudinal axis 5 of said turbojet 2. The direction oriented transversally with respect to the strut 4 and the same as the direction oriented transversally with respect to the turbojet 2 will be called Y, and the vertical direction or the height will be called Z. These three directions X, Y and Z are mutually orthogonal.

In addition, the terms "front" and "rear" should be considered with respect to a direction of forward movement of the aircraft resulting from the thrust exerted by the turbojet 2, which direction is shown diagrammatically with the arrow 7.

FIG. 1 shows that only the engine attachments 6, 8 and 9 of the rigid structure 10 of the attachment strut 4 have been shown. The other elements forming this strut 4, which are not shown, such as the means for attaching the rigid structure 10 under the wing of the aircraft, or the secondary structure ensuring the segregation and maintenance of the systems while supporting aerodynamic fairings, are classic elements identical or similar to those of the prior art, and known to a person skilled in the art. Consequently, no detailed description of them will be provided.

The rigid structure 10 has the classic shape of a box formed by an upper spar 18 and a lower spar 20 both extending in the direction X and substantially in a plane XY or slightly inclined with respect to the latter, as well as by two side panels 22 (only one is visible in FIG. 1) both extending according to the direction X and substantially in a plane XZ. Inside said box, cross ribs 24 arranged according to planes YZ and spaced apart longitudinally reinforce the rigidity of the rigid structure 10. It is noted by way of indication that elements 18, 20 and 22 can each be produced as a single piece, or by assembly of connected sections.

In addition, the turbojet 2 has, at the front, a large fan casing 12 delimiting an annular fan channel 14, and comprises, toward the rear, a smaller central case 16, containing the core of said turbojet. Finally, the central case 16 extends rearward with an exhaust case 17, which is larger than case 16. The cases 12, 16 and 17 are of course secured to one another.

As shown in FIG. 1, the plurality of engine attachments is formed by a front engine attachment 6, a rear engine attachment 8 in fact forming two rear half-attachments, as well as an attachment 9 forming a device for taking up thrust forces generated by the turboshaft engine 2. As shown diagrammatically in FIG. 1, this device 9, for example, takes the form of two lateral connecting rods (only one is visible in the side view) connected to a rear portion of the fan case 12 and to a spreader beam 28 mounted on the rear attachment 8 by two pins 29.

Figure 2:
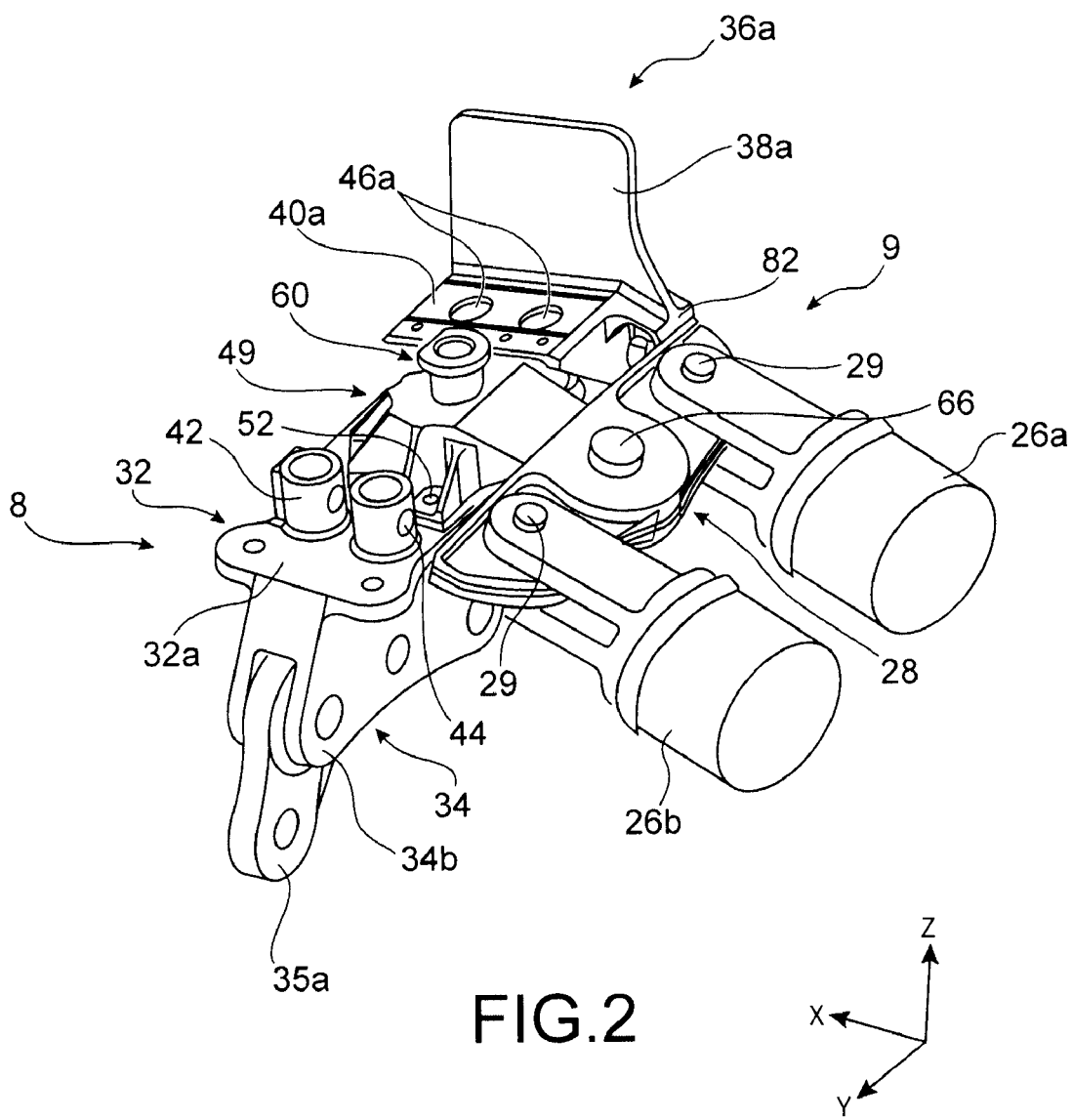
FIG. 2 is a perspective view of a first embodiment of an attachment device according to the present invention.

FIG. 2 shows a three-quarter perspective view of a first embodiment of an attachment device according to the present invention.

The attachment device comprises the rear engine attachment 8 and the thrust force take-up device 9 attached to the rear engine attachment 8.

Figure 3:
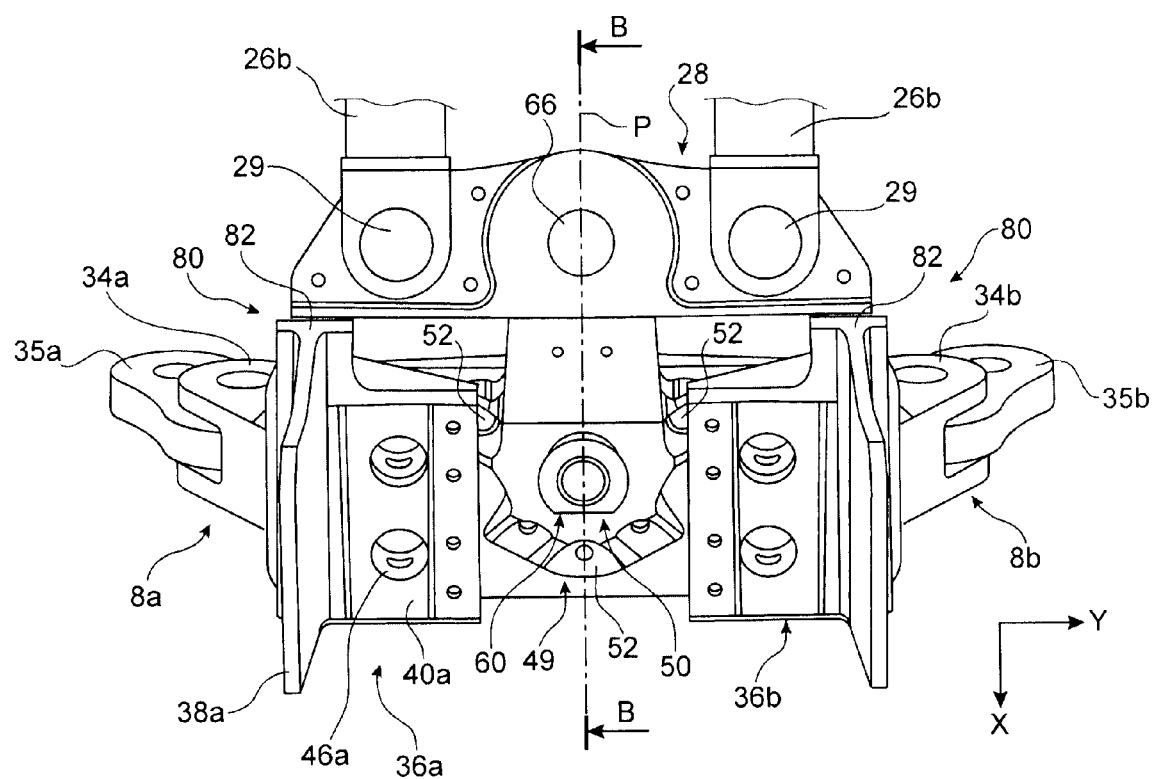
FIG. 3 is a top view of the device of FIG. 2.

The attachment device comprises a plane of symmetry P shown in FIGS. 1 and 3 and extending according to directions X and Z.

The rear engine attachment 8 comprises a body formed by a base 32 intended to be arranged on the side of the lower spar 20 forming the lower end of the box 10.

The body also comprises a support fitting substantially in the form of an arc of circle attached under the base opposite the lower spar 20.

Advantageously, the base 32 and the support fitting 34 are made in a single piece of a metal material.

The support fitting 34 comprises a right-hand end 34a and a left-hand end 34b connected to the engine, and more specifically to the fan case by shackles 35a, 35b, to which they are mechanically connected by pins (not shown). The rear engine attachment 8 then forms, as described above, two half-attachments, a right-hand half-attachment 8a and a left-hand half-attachment 8b.

The rear engine attachment 8 is attached to the box, by means of two lateral fittings arranged on either side of the plane of symmetry of the box and attached by fishplating to the box 10, a right-hand lateral fitting 36a and a left-hand lateral fitting 36b.

The right-hand and left-hand sides are considered with respect to the plane P and looking from front to back, i.e. attachment 6 to attachment 8 in FIG. 1.

We will describe in detail the right-hand lateral fitting 36a, as the left-hand lateral fitting has the same structure. The lateral fitting 36a comprises a first plate 38a contained in a plane XZ and a second plate 40 arranged at a right angle in a plane XY, in which the first plate 38a is attached by fishplating between a lateral wing (not shown) of the lower spar 20 contained in a plane XZ and a side panel 22.

The second plate 38a is contained in a plane XY parallel to the lower spar 20 at a distance from it, enabling the rear engine attachment 8 to be mounted onto the lateral fittings, as will be described below.

The base 32 comprises, in the example shown, projecting from the face 32a thereof opposite a lower face of the lower spar 20, two pairs of pins 42, each arranged symmetrically on either side of the plane of symmetry P; the pins 42 of each pair are aligned according to the direction X and comprise a bore 44 in direction X.

It is of course understood that the number of pins may be greater than two, and that it is possible to have more than one pair of pins on either side of the plane of symmetry P.

We will now describe the attachment of the left-hand pair of pins 42 on the right-hand lateral fitting 36a.

The left-hand lateral fitting 36a comprises two holes 46a formed in the second plate 40a contained in the plane XY and arranged one with respect to the other, corresponding to the arrangement of pins 42.

In FIG. 2, the pins 42 are not shown inserted in the holes 46a.

The pair of pins 42 is mounted in the pair of holes 46a formed on the side of a lower face of the second plate 40a and end between an upper face of the second plate 40 and the lower spar 20. Each bore 44 of the pins 42 receives an internal pin (not shown) according to the X-axis.

The base 32 is attached to the box by means of tension bolts (not shown), for example two on each side. These tension bolts enable forces according to the Z-axis to be taken up and the torque according to X to be taken up.

The pins by means of the internal pins ensure that the forces according to the Z-axis are taken up from the rear engine attachment 8 on the box in the event of a breakage of the tension bolts. Moreover, the pins are mounted with clearance in the plate 40, and thus take up the torque according to X only in the event of a breakage of a lateral fitting.

The attachment of the pair of right-hand pins 42 on the left-hand lateral fitting 36b is similar to that of the pair of left-hand pins and will not therefore be described in detail.

According to the present invention, the device for taking up thrust forces comprises a connection fitting 49 arranged between the base 32 and the lower spar 20 and attached to the upper face of the base 32 symmetrically with respect to the plane of symmetry P.

Advantageously, this fitting is doubled so as to ensure the failsafe function.

The connection fitting in fact consists of an external connection fitting 50 and an internal connection fitting 56 housed in the external connection fitting 50.

The external connection fitting comprises a body 51 equipped with mounting lugs 52 projecting from the periphery thereof, each equipped with at least one bore 54 for attachment to the base 32 by means of tension bolts (not shown). In the example shown, the fitting comprises two lateral lugs 52 equipped with a bore 54 and a lug 52 projecting from a rear end of the connection fitting 50 and equipped with three bores 54.

Advantageously, reinforcing ribs 57 are provided between the mounting lugs 52 and the body 51 so as to increase the rigidity of the attachment.

It is possible to replace the attachment pins with a peripheral flange.

The body 51 comprises a central bore 58 for receiving a first end of the thrust pin 60 intended to transmit the thrust forces from the connection fitting 50 to the box, in which a second end of the pin 60 is mounted in the box 10.

The body 51 extends forward with a plate 62 equipped with a bore 64 receiving a mechanical connection pin 66 of the spreader beam 28.

Advantageously, the plate 62 is tilted forward and downward substantially according to the direction of the connecting rods 26.

The body 51 of the connection fitting 50 is delimited by lateral walls, in which a rear wall and an upper wall define a hollow volume, and receive the lower connection fitting 56, thus forming a failsafe connection fitting.

The internal connection fitting 56 has substantially the same shape as the fitting 50; it comprises a body 68 and lateral and rear pins 70 sandwiched between the pins 52 and the base 32, and a plate 72 extending forward and parallel to the plate 62, equipped with a bore 73 for passage of the pin 66.

The body 68 also comprises a bore 75 opposite the bore 58 of the body 51 for receiving an end of the thrust pin 60.

The two plates 62, 72 extend parallel at a distance from one another, delimiting a space for receiving a portion of the spreader beam 28.

A simple connection fitting 49, i.e. not comprised of two fittings, of course does not go beyond the scope of the present invention.

Figure 4:
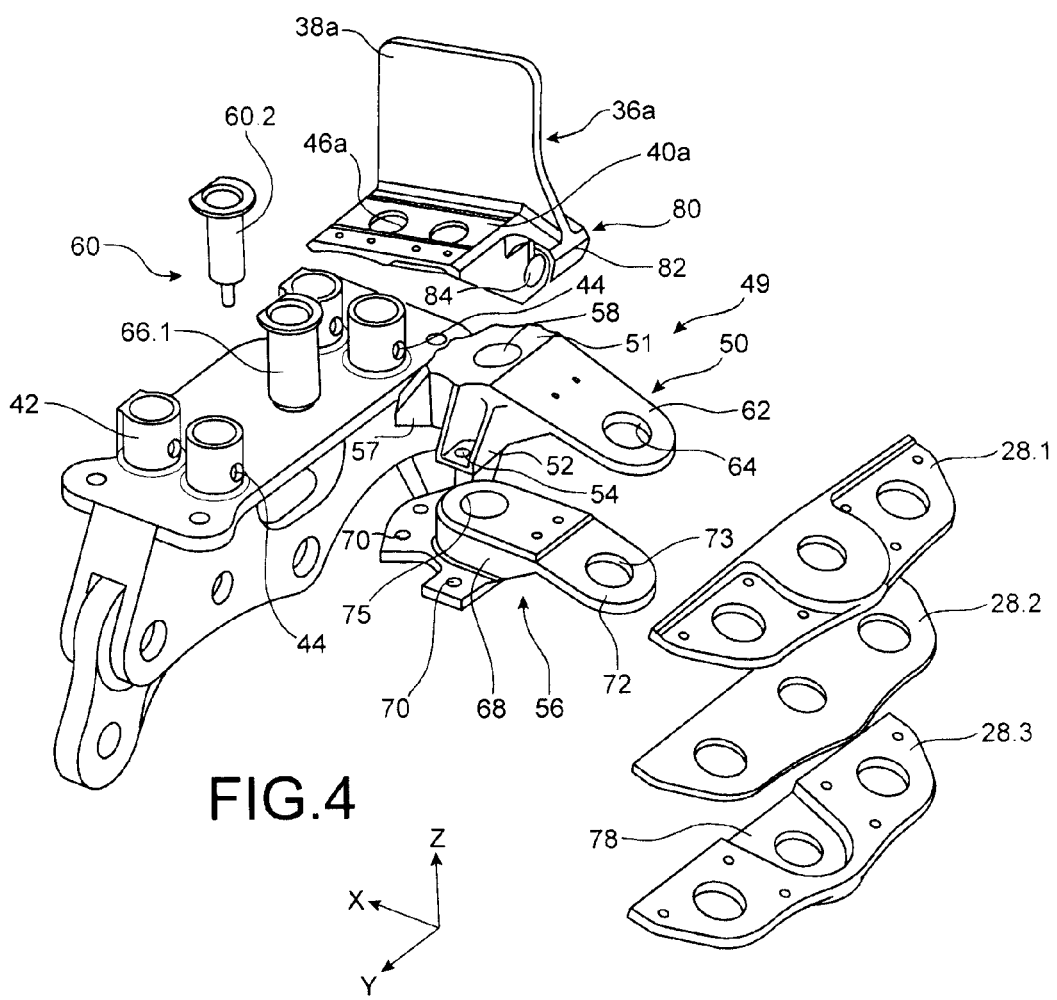
FIG. 4 is an exploded view of the device of FIG. 2, from which certain pins have been omitted.
Figure 5:
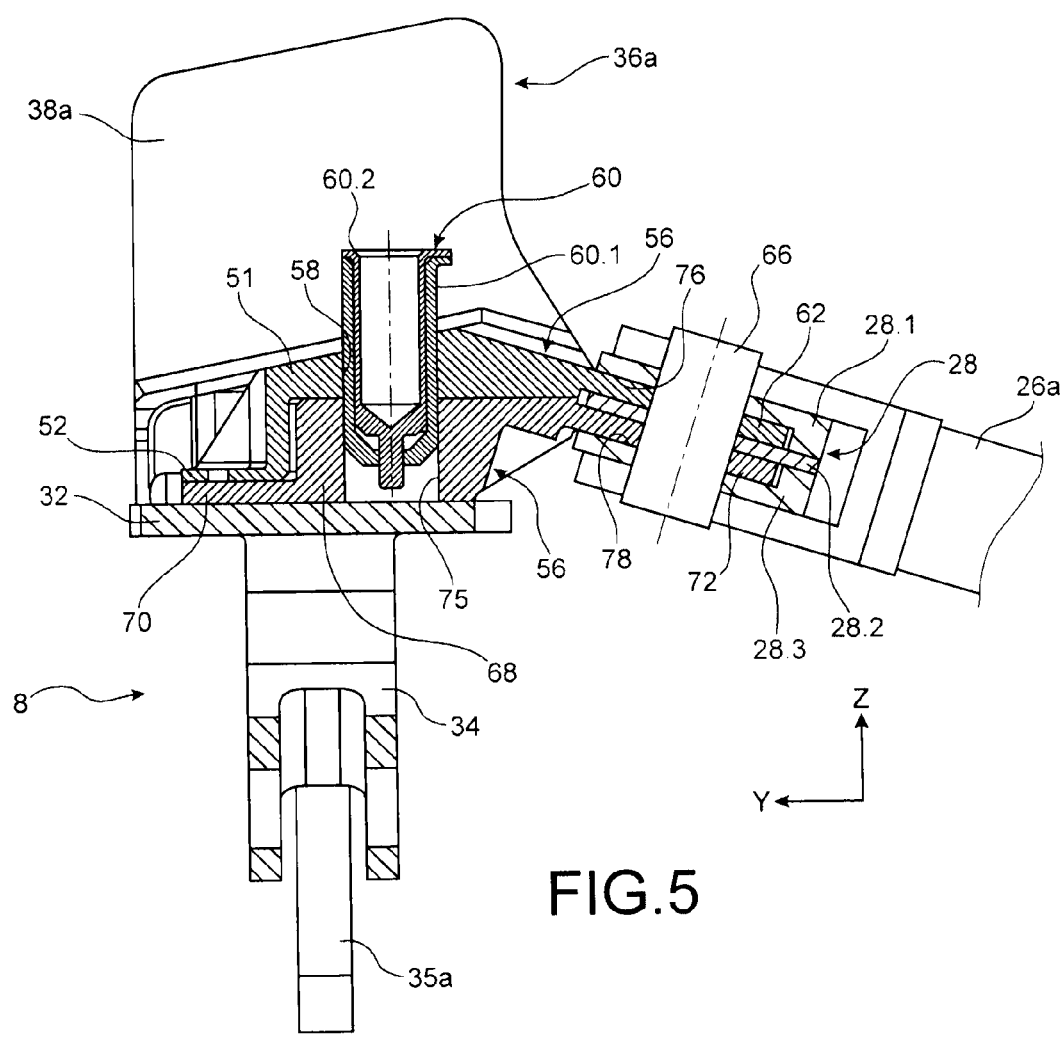
FIG. 5 is a cross-section view according to the A-A cross-section plane of FIG. 3.

Advantageously, and as is particularly visible in FIGS. 4 and 5, the spreader beam 28 is formed by a first portion 28.1, a second portion 28.2 and a third portion 28.3 superimposed and ensuring the failsafe function in the event that one of them should break.

In the example shown, the first 28.1 and third 28.3 portions are arranged respectively above the plate 62 and below the plate 72, and the second portion 28.2 is arranged in the space provided between the plates 62, 72. Thus, the plate 62 is sandwiched between the first 28.1 and the second 28.2 portions of the spreader beam 28 and the plate 72 is sandwiched between the second 28.2 and third 28.3 portions of the spreader beam 28.

Advantageously, an impression 76 is hollowed in the face of the first portion 28.1 in contact with the plate 62, and an impression 78 is hollowed in the face of the second portion 28.2 in contact with the plate 72. These impressions 76, 78 enable the thickness of the spreader beam to be reduced.

In addition, these impressions 76, 78 have a V-shape of which the opening faces backwards so as to enable the spreader beam to pivot around the pin 66 with respect to the connection fittings 50, 56.

According to this invention, if a connecting rod 26 breaks, the spreader beam 28 acts as a stop against the lateral fitting 36 on the side of the intact connecting rod 26, thereby making it possible to do without an additional stop fitting.

According to this invention, each lateral fitting 36a, 36 comprises a portion 80 projecting forward at the level of the connection between the first 38a and the second 40a plate ending with a stop plate 82 extending substantially according to directions Y and Z.

Advantageously, a reinforcing rib 84 is provided under the projecting portion 80.

We will now describe the paths for taking up forces exerted according to directions X, Y and Z by the device according to this invention.

In normal operation, when all of the parts are intact, as is shown in FIG. 2, the forces exerted according to direction Z are taken up by the rear engine attachment 8 and the lateral fittings via the tension bolts. The lateral forces exerted according to direction Y are taken up by the rear engine attachment 8 via the pins 42 and the thrust pin 60, via the connection fittings 50, 56.

The forces generated by the engine and exerted according to direction X are transmitted from the connecting rods 26 to the spreader beam 28 by the pins 29, then from the spreader beam 28 to the connection fittings 50, 56 by the pin 29, then from the connection fittings 50, 56 to the box by the thrust pin 60.

If the left-hand connecting rod breaks, in a "reverse-mode" operation, when the engine exerts a forward force, the spreader beam 28 pivots around the pin and stops against the stop plate 82 of the right-hand lateral fitting 36a, and the forces are then transmitted from the right-hand connecting rod 26a to the right-hand lateral fitting 36a, then from the right-hand lateral fitting 36a to the box 10.

If the right-hand connecting rod 26a breaks, the left-hand lateral fitting takes up the forces.

According to the application of the force, a more or less significant portion of this force is taken up by the spreader beam, the pin 66 and the connection fitting.

When the engine exerts a thrust force, if the right-hand connecting rod breaks, the spreader beam pivots around the pin and stops against the stop plate 82 of the right-hand lateral fitting 36a, and the thrust forces are then taken up by the left-hand lateral fitting 36a.

According to the application of the thrust force, a more or less significant portion of the thrust forces is taken up by the spreader beam, the pin 66 and the connection fitting.

If one of the three portions 28.1, 28.2, 28.3 of the spreader beam breaks, the two intact portions transmit the forces from the connecting rods 26a, 26b to the thrust pin 60.

If the external connection fitting 50 breaks, the internal connection fitting 56 takes over and transmits the forces from the spreader beam 28 to the box 10 via the thrust pin 60.

In normal operation, the torque according to X is taken up on the rear attachment by the tension bolts on each side of the attachment. If one or more of the tension bolts break(s), the torque according to X is taken up by the pins 42.

The torques according to Y and Z are taken up both by the rear engine attachment and the front engine attachment.

Advantageously, the pin 60 is of the failsafe type, i.e. it is a double pin, and comprises, as can be seen in FIG. 4, an external pin 60.1 and an internal pin 60.2. Thus, in the event of a breakage of the external pin 60.1, the internal pin 60.2 takes over.

Advantageously, the pin 66 is of the failsafe type, i.e. it is a double pin, and comprises an external pin and an internal pin. Thus, in the event of a breakage of the external pin, the internal pin takes over.

Figure 6:
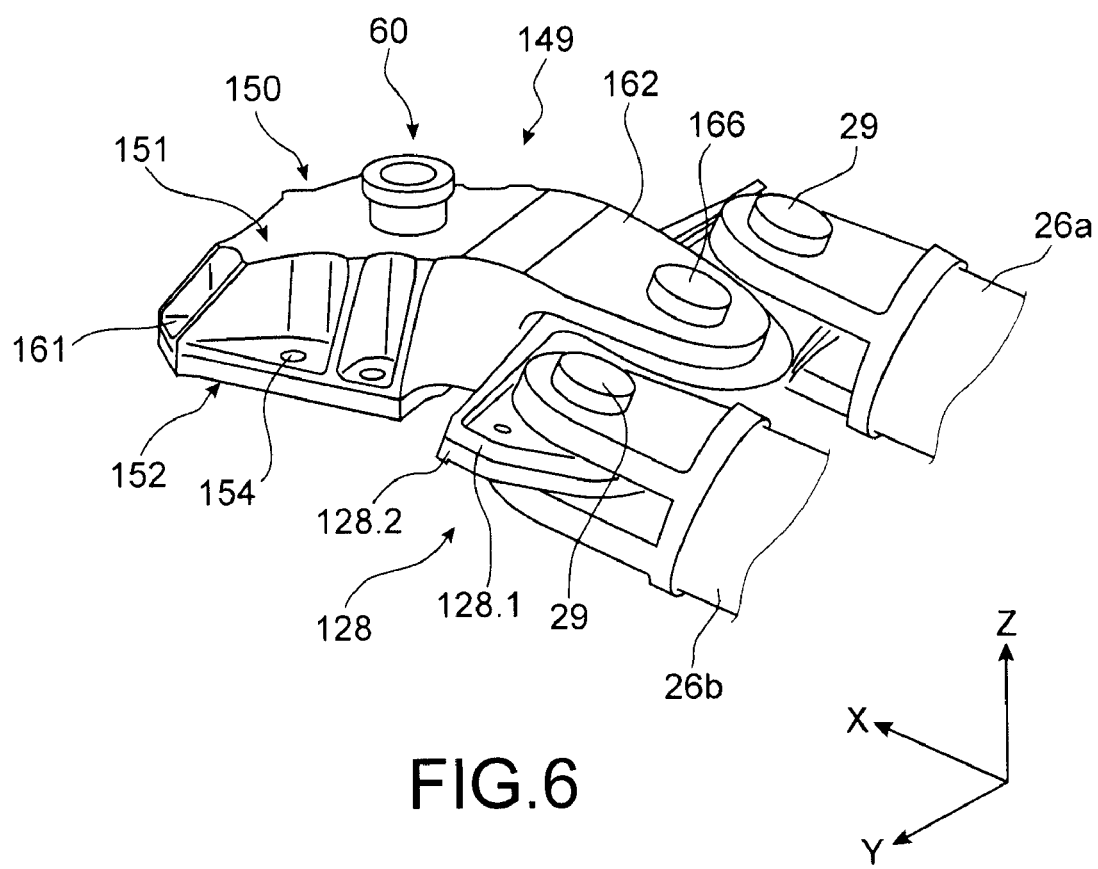
FIG. 6 is a perspective view of a portion of a second embodiment of an attachment device according to the present invention, shown in isolation.
Figure 7:
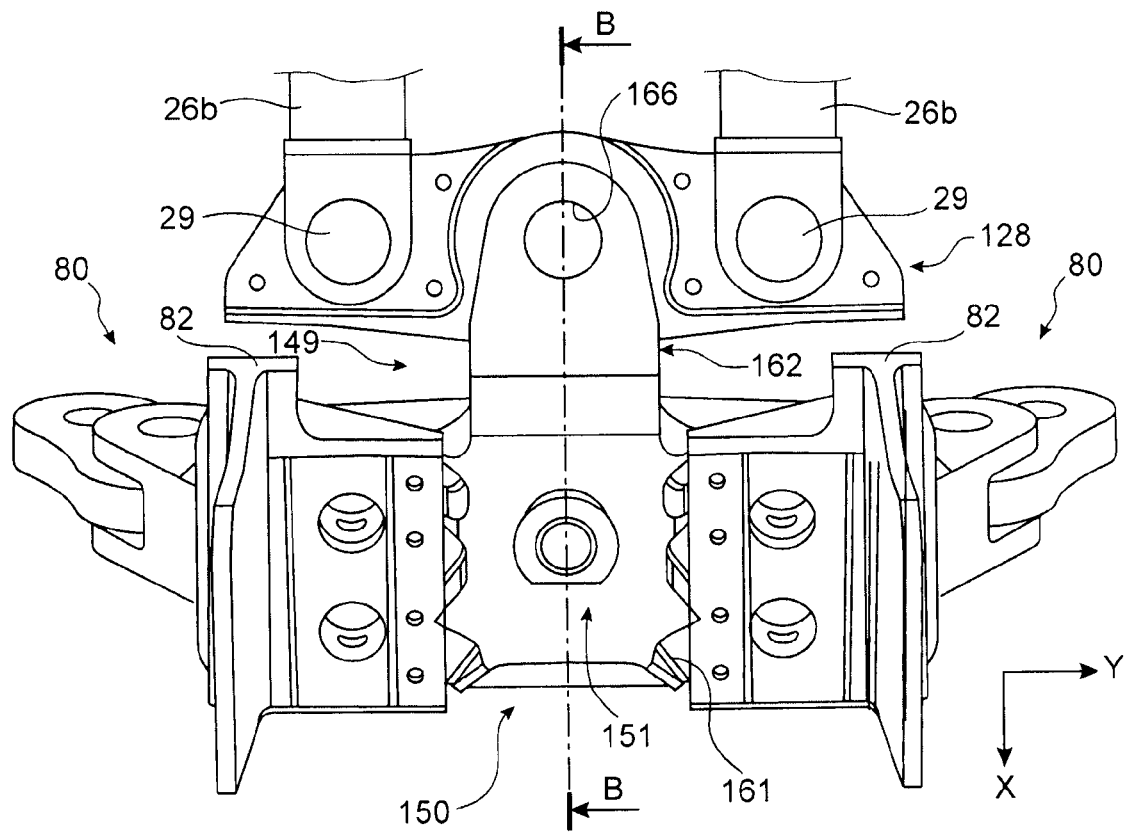
FIG. 7 is a top view of the device of FIG. 6 with the lateral fittings and the rear engine attachment.

FIG. 6 shows an attachment device according to a second embodiment of this invention, in which said device according to the second embodiment differs primarily from the device according to the first embodiment in the structures of the connection fittings and the spreader beam.

For the purpose of simplification, the elements having substantially the same shape and the same function as in the first embodiment will be designated by the same references.

As the attachment of the rear engine attachment is similar to that of the first embodiment, the description regarding the first embodiment also applies to the former.

According to this second embodiment, the mechanical connection between the spreader beam 128 and the box 10 is made by a connection fitting 149, advantageously made by two connection fittings fitted one in the other, an external fitting 150 and an internal fitting 152.

The external fitting 150 comprises a body 151 bordered laterally and toward the rear by an attachment flange 161 drilled with bores 154 to enable the first fitting 150 to be attached to the base 32 by means of tension bolts (not shown).

It is possible to envisage, as in the first embodiment, providing attachment pins.

The body 151 is delimited by two lateral walls 153, an upper wall 155, a rear wall 157 and a front wall 159.

The body 151 also comprises a bore 160 substantially at the center of its upper wall 155 for receiving an end of a thrust pin 60.

The external connection fitting 150 also comprises a clevis mounting 162 extending from the front wall 159, which clevis mounting receives the spreader beam 128.

The clevis mounting 162 is tilted forward and downward substantially according to the direction of inclination of the connecting rods 26a, 26b.

The clevis mounting 162 is drilled with a bore 164 receiving a pin 166.

The front wall 159 is drilled so as to enable the passage of a plate 168 of the second fitting 152.

The internal fitting 152 comprises a body 170 with a shape and size suitable for penetrating the body 151 of the first fitting 150 and the plate 168 projecting from a front face of the body 170.

The body 170 comprises a peripheral flange 172 also drilled with bores corresponding to those of the flange 156 of the external fitting 150 and inserted between the flange 156 of the external fitting and the base 32.

The body 170 comprises a bore 171 opposite bore 160 of the body 151 for receiving the end of the thrust pin 60.

The plate 168 comprises a bore 169 opposite those of the clevis mounting 162 for the passage of the pin 166.

Figure 9:
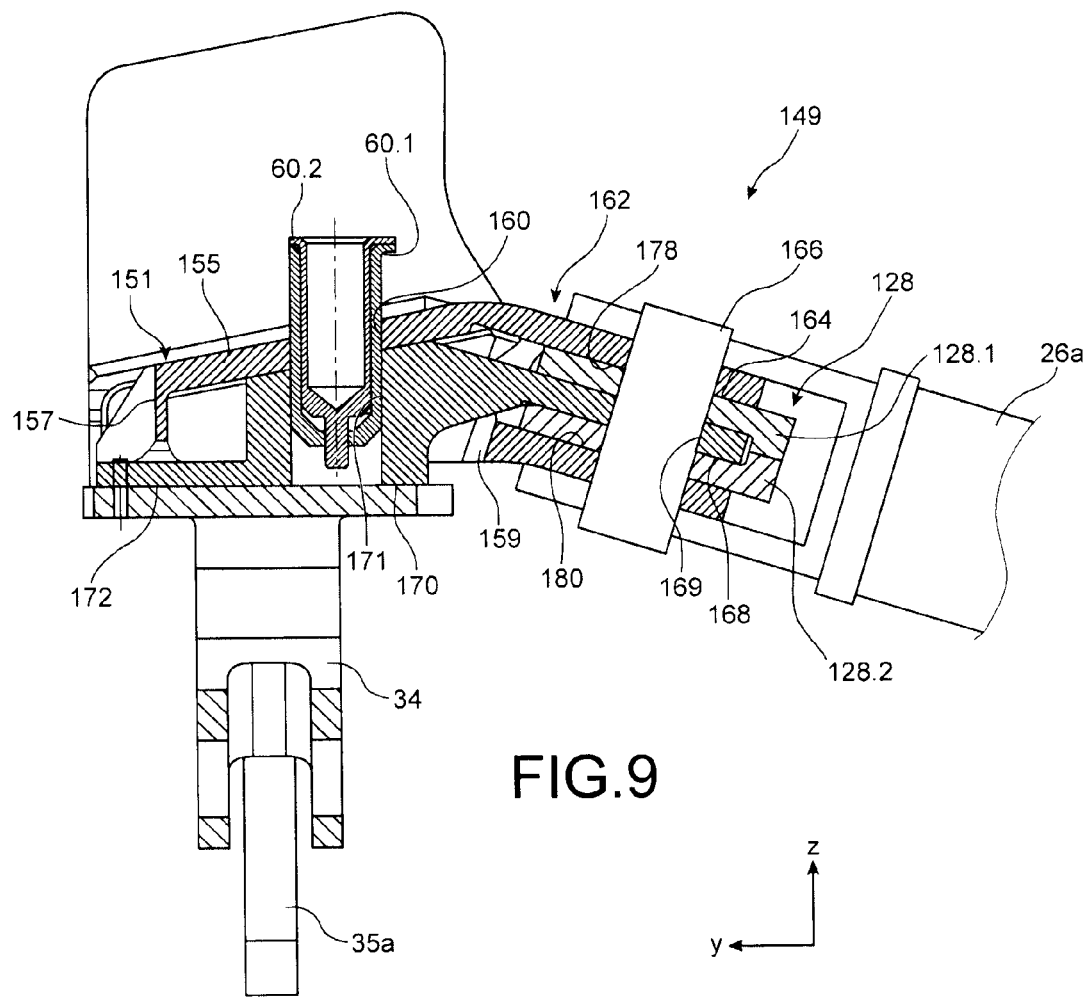
FIG. 9 is a cross-section view according to the B-B cross-section plane of FIG. 7.

When the internal fitting 152 is positioned in the external fitting 150, the plate passes through the front wall 159 of the body 151 of the external connection fitting 150 and is housed between the two branches of the clevis mounting 162, as can be seen in particular in FIG. 9.

The plate 168 extends parallel to the branches of the clevis mounting 162 and at a distance from them, thus providing two spaces.

A simple connection fitting 149, i.e. not comprised of two fittings, of course does not go beyond the scope of the present invention.

Advantageously, the spreader beam 128 is formed by two spreader beams 128.1, 128.2 respectively penetrating the spaces formed between the clevis mounting 162 and the plate 168.

Thus, if one of the spreader beams 128.1, 128.2 breaks, the other spreader beam takes over so as to transmit the forces.

The two spreader beams 128.1, 128.2 have a similar shape and advantageously comprise an impression 178, 180 on their face in contact with the plate 168 for receiving said plate 168.

Each spreader beam 128.1, 128.2 comprises two lateral bores for connection to the connecting rods 26a, 26b and a central bore for connection to the connection fittings 150, 152.

The impressions 178, 180 have a V-shape of which the opening faces backwards so as to enable the spreader beam to pivot around the pin 168.

According to this invention, and similarly to the first embodiment, each lateral fitting 36a comprises a portion 80 projecting forward at the level of the connection between the first 38a and the second 40a plate ending with a stop plate 82 extending substantially according to directions Y and Z.

Advantageously, a reinforcing rib 84 is provided under the projecting portion 80.

The impressions 178, 180 allow a sufficient angle of rotation to enable the spreader beam to stop against one of the projecting portions 80 of the lateral fittings.

We will now describe the paths for taking up forces exerted according to directions X, Y and Z by the device according to the second embodiment of this invention.

In normal operation, when all of the parts are intact, as shown in FIG. 2, the forces exerted according to direction Z are taken up by the rear engine attachment 8 and the lateral fittings via the pins 42 and the internal pins introduced into the pins 42. The lateral forces exerted according to direction Y are taken up by the rear engine attachment 8 and the thrust pin 60, via the connection fittings 150, 152. The thrust forces generated by the engine and exerted according to direction X are transmitted from the connecting rods 26 to the spreader beam 128 by the pins 29, then from the spreader beam 128 to the connection fittings 150, 152 by the pin 166, then from the connection fittings 150, 152 to the box 10 by the thrust pin 60.

If the left-hand connecting rod breaks, in a "reverse-mode" operation, when the engine exerts a forward force, the spreader beam 128 pivots around the pin and stops against the stop plate 82 of the right-hand lateral fitting 36a, and the forces are then transmitted from the right-hand connecting rod 26a to the right-hand lateral fitting 36a, then from the right-hand lateral fitting 36a to the box 10.

If the right-hand connecting rod 26a breaks, the left-hand lateral fitting takes up the forces.

According to the application of the force, a more or less significant portion of this force is taken up by the spreader beam, the pin 66 and the connection fitting.

When the engine exerts a thrust force, if the right-hand connecting rod breaks, the spreader beam 128 pivots around the pin and stops against the stop plate 82 of the right-hand lateral fitting 36a, and the thrust forces are then taken up by the left-hand lateral fitting 36a.

According to the application of the thrust force, a more or less significant portion of the thrust forces is taken up by the spreader beam, the pin 66 and the connection fitting.

If one of the two spreader beams 128.1, 128.2 breaks, the other spreader beam transmits the thrust forces transmitted by the connecting rods 26a, 26b to the thrust pin 60.

If the external connection fitting 150 breaks, the internal connection fitting 152 takes over and transmits the forces from the spreader beam 128 to the box 10 via the thrust pin 60.

In normal operation, the torque according to X is taken up on the rear attachment by the tension bolts on each side of the attachment. If one or more of the tension bolts break(s), the torque according to X is taken up by the pins 42.

The torques according to Y and Z are taken up both by the rear engine attachment and the front engine attachment.

Figure 8:
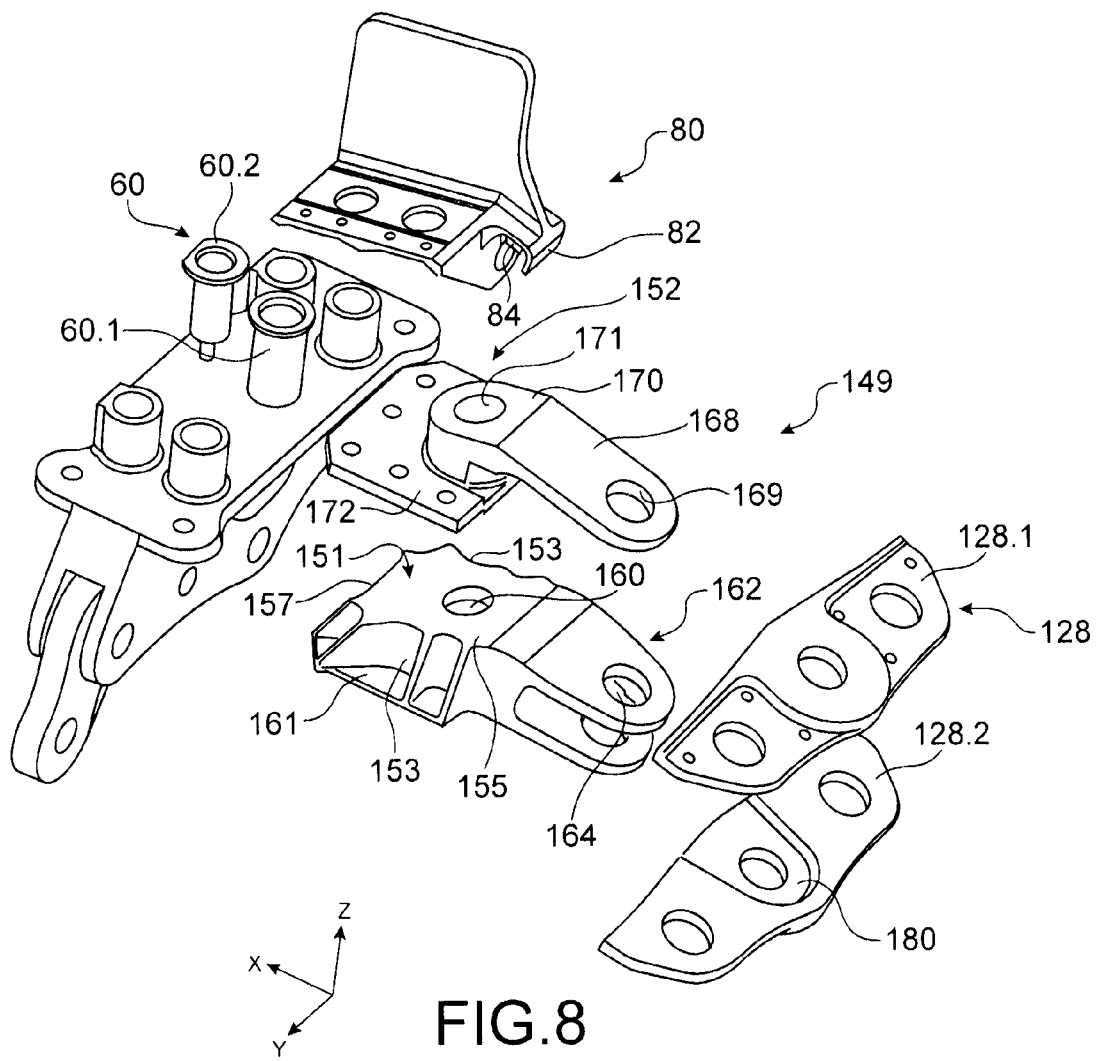
FIG. 8 is an exploded view of the device of FIG. 7, from which certain pins have been omitted.

As in the first embodiment, the pin 60 is advantageously of the failsafe type, i.e. it is a double pin, and comprises, as can be seen in FIGS. 8 and 9, an external pin 60.1 and an internal pin 60.2. Thus, in the event of a breakage of the external pin 60.1, the internal pin 60.2 takes over.

Similarly, the pin 166 is advantageously of the failsafe type, i.e. it is a double pin, and comprises an external pin and an internal pin. Thus, in the event of a breakage of the external pin, the internal pin takes over.

The force take-up devices shown in FIGS. 2 to 9 have been described solely by way of a non-limiting example. Modifications may be made without going beyond the scope of the invention. For example, it is possible to provide an attachment for the rear attachment on the lateral fittings in a different manner. Also, the shape of the connection fitting may be modified according to the configuration of the available space, as well as the shape and the number of parts comprising the spreader beam.

The connection fitting 49 is of the failsafe type and in fact comprises two fittings 50, 56, one in the other, and the pin 66 between the spreader beam and said fitting is mounted without clearance in the two fittings (FIG. 5). Consequently, the two fittings are simultaneously urged in normal operation. This also applies to the second embodiment.

The invention claimed is:

1. An aircraft engine attachment device comprising:
a rigid structure; and
means for attaching an engine on the rigid structure, wherein the means for attaching comprises a rear engine attachment and a device for taking-up thrust forces generated by the engine,
wherein the rear engine attachment is attached to the rigid structure by two lateral fittings attached to the rigid structure,
wherein said device comprises two connecting rods mechanically connected to a spreader beam at a level of a rear end by a mechanical connection, a connection fitting attached to the rear engine attachment and mechanically connected to the rigid structure by a thrust pin,
wherein the spreader beam is mechanically connected to the connection fitting and the lateral fittings limit pivoting of the spreader beam if at least one of said two connection rods breaks and ensuring transmission of thrust forces generated by the engine to the rigid structure,
wherein the connection fitting comprises an external fitting and an internal fitting, and
wherein the external fitting comprises a hollow body and a first plate extending toward a front of a casing and the internal fitting comprises a body housed in the hollow body of the external fitting and comprising a second plate extending forward from the body parallel to the first plate, the first and second plates forming a clevis mounting to which the spreader beam is mechanically connected.

2. An attachment device according to claim 1, wherein the spreader beam comprises a first and a third portion forming a clevis mounting and surrounding the clevis mounting of the connection fitting, and a second portion inserted between the first and the third portions, in which the second portion penetrates the clevis mounting of the connection fitting.

3. An aircraft engine attachment device comprising:
a rigid structure; and
means for attaching an engine on the rigid structure,
wherein the means for attaching comprises a rear engine attachment and a device for taking-up thrust forces generated by the engine,
wherein the rear engine attachment is attached to the rigid structure by two lateral fittings attached to the rigid structure,
wherein said device comprises two connecting rods mechanically connected to a spreader beam at a level of a rear end by a mechanical connection, a connection fitting attached to the rear engine attachment and mechanically connected to the rigid structure by a thrust pin,
wherein the spreader beam is mechanically connected to the connection fitting and the lateral fittings limit pivoting of the spreader beam if at least one of said two connection rods breaks and ensuring transmission of thrust forces generated by the engine to the rigid structure,
wherein the connection fitting comprises an external fitting and an internal fitting, and
wherein the external fitting comprises a body formed by a casing without a base, and a clevis mounting extends forward from a front wall of the casing; the front wall comprises a hole enabling communication between an inside of the casing and a space between branches of the clevis mounting, and the internal fitting comprises a body housed in the body of the external fitting and a plate passing through the hole of the front wall and housed between the branches of the clevis mounting, the spreader beam comprises two portions forming a clevis mounting; the clevis mounting receives the plate of the internal fitting and is received in the clevis mounting of the external fitting.

4. An attachment device according to claim 1, wherein the bodies of the external and internal fittings each comprise means for peripheral attachment to the rear engine attachment by tension bolts, in which the means for attaching the internal fitting are clamped between the means for attaching the external fitting and the rear engine attachment.

5. An attachment device according to claim 3, wherein the bodies of the external and internal fittings each comprise means for peripheral attachment to the rear engine attachment by tension bolts, in which said means for peripheral attachment of the internal fitting are clamped between said means for peripheral attachment of the external fitting and the rear engine attachment.

6. An attachment device according to claim 1, wherein each lateral fitting comprises a first plate attached by fishplating to the rigid structure and a second plate orthogonal to the first plate and substantially parallel to a lower spar of the rigid structure, in which the rear engine attachment comprises a base attached by tension bolts to the rigid structure.

7. An attachment device according to claim 6, wherein the second plate comprises at least two holes, in which the base includes projecting pins, the pins comprise bores orthogonal to their axis, the pins pass through the second plate by the holes and an internal pin is mounted in each bore of the pins.

8. An engine assembly comprising:
an engine; and
an engine attachment device, in which the attachment device comprises:
a rigid structure; and
means for attaching an engine on the rigid structure,
wherein the means for attaching comprises a rear engine attachment and a device for taking-up thrust forces generated by the engine,
wherein the rear engine attachment is attached to the rigid structure by two lateral fittings attached to the rigid structure,
wherein said device comprises two connecting rods mechanically connected to a spreader beam at a level of a rear end by a mechanical connection, a connection fitting attached to the rear engine attachment and mechanically connected to the rigid structure by a thrust pin,
wherein the spreader beam is mechanically connected to the connection fitting and the lateral fittings limit pivoting of the spreader beam if at least one of said two connection rods breaks and ensuring transmission of thrust forces generated by the engine to the rigid structure,
wherein the connection fitting comprises an external fitting and an internal fitting, and
wherein the external fitting comprises a hollow body and a first plate extending toward a front of a casing and the internal fitting comprises a body housed in the hollow body of the external fitting and comprising a second plate extending forward from the body parallel to the first plate, the first and second plates forming a clevis mounting to which the spreader beam is mechanically connected.

9. An aircraft comprising:
at least one engine assembly comprising an engine and an engine attachment device,
in which the attachment device comprises:
a rigid structure; and
means for attaching an engine on the rigid structure, wherein the means for attaching comprises a rear engine attachment and a device for taking-up thrust forces generated by the engine, wherein the rear engine attachment is attached to the rigid structure by two lateral fittings attached to the rigid structure, wherein said device comprises two connecting rods mechanically connected to a spreader beam at a level of a rear end by a mechanical connection, a connection fitting attached to the rear engine attachment and mechanically connected to the rigid structure by a thrust pin, wherein the spreader beam is mechanically connected to the connection fitting and the lateral fittings limit pivoting of the spreader beam if at least one of said two connection rods breaks and ensuring transmission of thrust forces generated by the engine to the rigid structure, assembled on a wing or on a rear portion of the fuselage of the aircraft, wherein the connection fitting comprises an external fitting and an internal fitting, and wherein the external fitting comprises a hollow body and a first plate extending toward a front of a casing and the internal fitting comprises a body housed in the hollow body of the external fitting and comprising a second plate extending forward from the body parallel to the first plate, the first and second plates forming a clevis mounting to which the spreader beam is mechanically connected.

10. An engine assembly comprising:

an engine; and an engine attachment device, in which the attachment device comprises:

a rigid structure; and means for attaching an engine on the rigid structure, wherein the means for attaching comprises a rear engine attachment and a device for taking-up thrust forces generated by the engine, wherein the rear engine attachment is attached to the rigid structure by two lateral fittings attached to the rigid structure, wherein said device comprises two connecting rods mechanically connected to a spreader beam at a level of a rear end by a mechanical connection, a connection fitting attached to the rear engine attachment and mechanically connected to the rigid structure by a thrust pin, wherein the spreader beam is mechanically connected to the connection fitting and the lateral fittings limit pivoting of the spreader beam if at least one of said two connection rods breaks and ensuring transmission of thrust forces generated by the engine to the rigid structure, wherein the connection fitting comprises an external fitting and an internal fitting, and wherein the external fitting comprises a body formed by a casing without a base, and a clevis mounting extends forward from a front wall of the casing; the front wall comprises a hole enabling communication between an inside of the casing and a space between branches of the clevis mounting, and the internal fitting comprises a body housed in the body of the external fitting and a plate passing through the hole of the front wall and housed between the branches of the clevis mounting, the spreader beam comprises two portions forming a clevis mounting; the clevis mounting receives the plate of the internal fitting and is received in the clevis mounting of the external fitting.

11. An aircraft comprising:

at least one engine assembly comprising an engine and an engine attachment device, in which the attachment device comprises:

a rigid structure; and means for attaching an engine on the rigid structure, wherein the means for attaching comprises a rear engine attachment and a device for taking-up thrust forces generated by the engine, wherein the rear engine attachment is attached to the rigid structure by two lateral fittings attached to the rigid structure, wherein said device comprises two connecting rods mechanically connected to a spreader beam at a level of a rear end by a mechanical connection, a connection fitting attached to the rear engine attachment and mechanically connected to the rigid structure by a thrust pin, wherein the spreader beam is mechanically connected to the connection fitting and the lateral fittings limit pivoting of the spreader beam if at least one of said two connection rods breaks and ensuring transmission of thrust forces generated by the engine to the rigid structure, assembled on a wing or on a rear portion of the fuselage of the aircraft, wherein the connection fitting comprises an external fitting and an internal fitting, and wherein the external fitting comprises a body formed by a casing without a base, and a clevis mounting extends forward from a front wall of the casing; the front wall comprises a hole enabling communication between an inside of the casing and a space between branches of the clevis mounting, and the internal fitting comprises a body housed in the body of the external fitting and a plate passing through the hole of the front wall and housed between the branches of the clevis mounting, the spreader beam comprises two portions forming a clevis mounting; the clevis mounting receives the plate of the internal fitting and is received in the clevis mounting of the external fitting.

\* \* \* \* \*